Aug. 24, 1943.   W. C. IFTIGER, SR   2,327,714
COUPLING
Filed June 4, 1940   2 Sheets-Sheet 1

INVENTOR.
William C. Iftiger, Sr.,
BY Russell M. Otis
ATTORNEY.

Aug. 24, 1943.       W. C. IFTIGER, SR       2,327,714
COUPLING
Filed June 4, 1940       2 Sheets-Sheet 2

INVENTOR.
William C. Iftiger, Sr.
BY Russell N. Otis
ATTORNEY.

Patented Aug. 24, 1943

2,327,714

UNITED STATES PATENT OFFICE 2,327,714

COUPLING

William C. Iftiger, Sr., Santa Fe Springs, Calif.

Application June 4, 1940, Serial No. 338,776

5 Claims. (Cl. 285—150)

This invention relates to a coupling, and has a particularly important application in the coupling of a hose or fluid conduit to a faucet, pipe, or other fluid conducting means. Some of the features disclosed in this application are described and claimed in my copending patent application, Serial No. 289,965, of which this application is a continuation in part.

It is an object of my invention to provide a coupling which can be conveniently and rapidly connected and disconnected.

Another object is to provide a threaded female coupling member which is adapted to be connected to a threaded male member such as the outlet of a faucet, a pipe, or the like, by simply pushing the female member over the threads of the male member, may be tightened to make a fluid-tight connection by turning the female member through a fraction of one turn, the two members being securely held in coupled relation against any accidental uncoupling, but being adapted to be uncoupled by simply turning the female member through a fraction of a turn relative to the male member and then pulling it straight off or off at an angle relative to the male member.

Another object is to provide a threaded female coupling member that can be partially engaged upon a threaded male member at an angle thereto and quickly aligned to the threads thereof.

Other objects are to provide a quickly connectible threaded coupling that has the strength of a common screw type coupling having the same number of threads of the same dimension, but which requires only a fraction of one turn in making a tight connection; and to provide a quickly connectible threaded coupling that can be readily converted into a common screw type coupling by simply moving a sliding collar of the device to its forward stop and leaving it in this position.

Another object of the invention is to provide a coupling which is adapted to tighten satisfactorily on male members of slightly different diameters.

Another object is to provide a female coupling member containing internally threaded jaws which are expanded radially outward against a restricting surface by action of cam surfaces when, in tightening, the jaws are moved axially forward.

Another object is to provide a female coupling member containing a plurality of internally threaded jaws adapted to mate with a threaded male member and which have lugs in sliding and rotative engagement with a tightening collar surrounding the jaws.

Still another object of the invention is to provide a coupling that is adapted for cheap manufacture on a large production basis, that is dependable in its operation, and is durable and of long life.

These and other apparent objects are attained in a manner that will be clear from consideration of the following description taken in connection with the accompanying drawings, of which:

Figure 1:
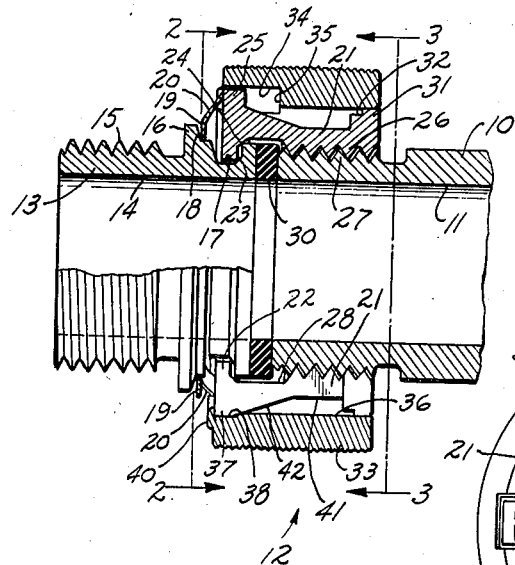
Fig. 1 is a view, partially in section, of one form of my coupling, taken along the line 1—1 of Fig. 2, showing the female coupling member in tightened coupled relation with a threaded male member.
Figure 2:
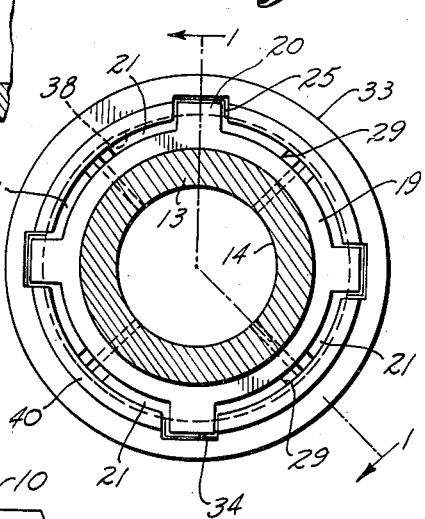
Fig. 2 is a sectional view of the coupling in the relation shown in Fig. 1, taken along the line 2—2.

While the coupling of my invention is adapted to connect a member of any character to any threaded male member of suitable dimensions, whether or not the members to be connected are provided with fluid passages therethrough, I have chosen to disclose herein that important embodiment of my invention in which a female coupling member having a fluid passage therethrough is rotatably connected to a fluid conduit such as a hose, or other means such as a fluid conducting member having either a male or female threaded surface thereon, and is adapted to be coupled to a threaded male member 10 having a fluid passage 11 therethrough and which may constitute the connecting part of a valve or faucet, or the end of a pipe or hose, or the like.

In the embodiment illustrated in Figs. 1-5, the female coupling member, designated generally by the numeral 12, is rotatably connected to a member 13 having a fluid passage 14 therethrough and being threaded on its exterior at 15 to form a male thread which may, if desired, be screwed into the ordinary female screw coupling generally provided on the end of a hose for connection with a faucet or the like. The member 13, adjacent its forward end, is formed with a radially outwardly directed flange 16 and forward of the flange 16 is grooved to provide a groove 17. The forward side of the flange 16 is recessed at 18 to provide an abutment for a resilient spider 19 preferably comprising a flat circular piece from which a plurality of arms 20 extend in an outward and forward direction, the whole being preferably made of spring metal, such, for example, as phosphor bronze.

Surrounding the forward end of the member 13 are a plurality of independently movable arcuate jaws 21, four in number in the disclosed embodiment, having at their rear ends inwardly directed flanges 22 disposed within the groove 17. The bottom of the groove 17 is somewhat wider than the axial width of the flanges 22 so as to provide ample clearance and the rear wall of the groove 17 preferably slopes backwardly to facilitate outward deflection of the jaws 21 about the inner rear edge of the flanges 22 as a fulcrum. The forward end of the groove 17, adjacent the bottom thereof, at 23, slopes forwardly and outwardly to form cam surfaces in such manner that as the jaws 21 are forced forwardly the inner and forward edge of the flanges 22 ride out on the sloping cam surfaces 23 and the jaws are moved outwardly. The length of the flanges 22 is sufficiently great to permit them to engage the bottom of the groove 17, when they are axially so disposed as to permit it, and at the junction of the flanges 22 with the rest of the jaws 21 sloping cam surfaces 24 are formed, preferably parallel to the cam surfaces 23 in such manner that when the jaws 21 are moved forwardly and the forward inner edge of the flanges 22 ride out on the cam surfaces 23, the jaws also tend to move outwardly by reason of the engagement of the cam surfaces 24 with the outer edge of the forward wall of the groove 17. Preferably directly above the flanges 22 are outwardly projecting lugs 25 against the rear surfaces of which the arms 20 of the resilient spider 19 press to urge the jaws 21 forward and hence urge the forward ends of the jaws inwardly.

Adjacent their forward ends, the jaws are provided with internal threads 26 of substantially the same diameter, pitch, and character as the threads 27 on the male member 10 to which the coupling is to be connected. Rearward of the threads 26 the jaws are preferably recessed at 28 to provide room for a flexible washer 30 which is retained in the coupling member 12 adjacent the forward end of the member 13 by the threads 26 of the jaws. At its forward end, each of the jaws 21 is formed with an outwardly directed arcuate flange 31 which is recessed at its outer rear edge, at 32, to form a step whose surface is of smaller diameter than the outer surface of the flange 31. The arcuate extent of the jaws 21 at their forward ends is preferably such that when the jaws are in place upon the male member, as in Fig. 5, the sides of the jaws are in contact and the jaws form a complete circle around the male member. When the male member is not inserted within the jaws 21, the inward movement of the jaws is limited by the mutual engagement of the jaws, and it will be evident that the jaws will under these circumstances also assume positions in which they form arcs of a common complete circle with the pitch diameter of the threads substantially equal to that of the male member 10 to which the coupling is intended to be attached. Throughout that part of the jaws lying to the rear of the flanges 31 the jaws are of less arcuate extent so as to form slots 29 between the jaws, providing ample clearance at the rear of the jaws for deflection thereof.

Surrounding the jaws 21 is a collar 33 of axial length preferably approximately equal to that of the jaws 21. The collar 33 has axially directed slots 34 adjacent its rear end, and of dimensions suitable for accommodating, with clearance, the lugs 25 of the jaws 21 in such manner that the collar can, in the untightened condition of the coupling, be moved axially over the jaws, with the lugs 25 sliding in the slots 34, but in rotative engagement with the jaws by reason of the engagement of the side walls of the slots 34 with the lugs 25. The slots 34 have only a limited axial length, terminating at the forward walls 35 of the slots which engage the forward ends of the lugs 25 in the rearmost position of the collar 33 and limit the rearward travel thereof relative to the jaws. The outer walls of the slots 34 preferably have clearance over the outer surfaces of the lugs 25 in both the untightened and tightened conditions of the coupling. The inner surface 36 of the collar is preferably cylindrical and of such diameter that it has clearance over the flanges 31 and also over the rearmost portion 37 of the jaws 21 when the coupling is in the untightened condition but restricts the outward deflection of the jaws upon tightening of the coupling. At the rear end of the collar 33, the inner surface 36 thereof is recessed at 38 to provide a surface of slightly greater diameter than the surface 36 and of slightly greater width than the outer surface of the portion 37. At the rear end, a cylindrical extension 40 of the collar is, after assembly of the female member, spun in over the rear of the jaws 21 all around the collar except at the slots 34. The exterior surfaces of the jaws 21 are formed with a groove 41 which preferably has a sloping rear wall 42 and is deep enough to permit the jaws 21 to expand outwardly sufficiently far to admit the male member 10 when the collar 35 is withdrawn into its rearmost position, as in Fig. 4.

The spring means acting on the rear of the jaws is in the disclosed embodiment in the form of a spider with resilient arms, but it will be evident that other forms of spring means may also be employed to act on the rear of the jaws, such, for example, as individual coil springs, or other means, disposed between the member 13 and the individual jaws.

Figure 4:
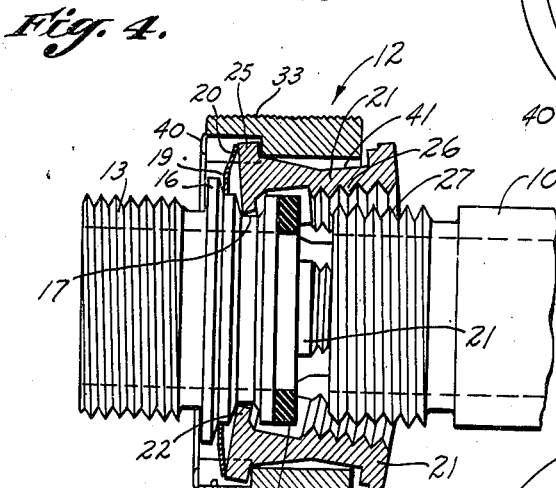
Fig. 4 is a view, partially in cross-section, of the coupling of Fig. 1, showing the threaded female coupling member being installed over a threaded male member in the act of coupling the male and female members.

The operation of the coupling illustrated in Figs. 1-5 is as follows. If it is desired to connect the coupling to the male member 10, the collar 33 is first moved to its rearmost position relative to the jaws 21. In this position, the forward walls 35 of the slots 34 are in engagement with the lugs 25. The member 13 or the part into which it is screwed is then pushed forward toward the male member 10 in such a way as to force the female member 12 over the threads of the male member, as illustrated in Fig. 4. In this action, the threads 27 of the male member 10 engage the threads 26 of the jaws 21 and spread them outwardly, the rear end of the flanges 22 being forced back to the rear end of the groove 17 and each jaw fulcruming about the inner rear edge of its flange 22. The spring arms 20 of the spider 19 are deflected as the jaws are expanded outwardly. The outward deflection of the jaws 21 takes place not only by reason of the cam action of the entering male threads on the threads of the jaws 21, but is also facilitated by the construction wherein the threads of the jaws 21 are located at a larger radius than the fulcrum point, which is the bottom of the groove 17, thus causing any rearwardly directed axial force on the threads 26 to produce a turning moment on each jaw tending to deflect it outwardly.

The female member 12 may be forced over the male member 10 until the end of the member 10 engages the washer 30. Since the spring arms 20 are bearing against the backs of the lugs 25 tending to deflect the forward portions of the jaws 21 inwardly, the jaws immediately and automatically close upon the male member when it is in the coupling as far as it will go. Generally the threads 26 naturally align with the threads 27, but if they do not, it is only necessary to rotate the female member 12 slightly and the two sets of threads will fall into alignment. An important feature of the coupling is that the female member 12 may be forced over the male member 10 at an angle thereto, making it unnecessary to align the two members before connecting them, this action being possible by virtue of the fact that the jaws are independently movable in a radial direction. Another important feature is that the jaws 21 may be opened up for admission of the male member 10 by moving the collar 33 rearwardly with respect to the member 13. In this action the walls 35 engage the lugs 25 and first move the jaws rearwardly until the flanges 22 engage the rear wall of the groove 17, then tilt the jaws backward against the force of the spring arms 20 so as to deflect the forward ends of the jaws outward. In this manner, the female coupling member 12 may be expanded and placed in position over the threads of the male member with the end of the male member against the washer 30. When the collar 33 is released, the jaws will close inwardly upon the threads of the male member by reason of the spring arms 20 acting on the backs of the lugs 25. It will be noted that in the outward deflection of the jaws 21, with the collar 33 in its rearward position, the forward end of the collar 33 is received in the groove 41 of the jaws.

Figure 5:
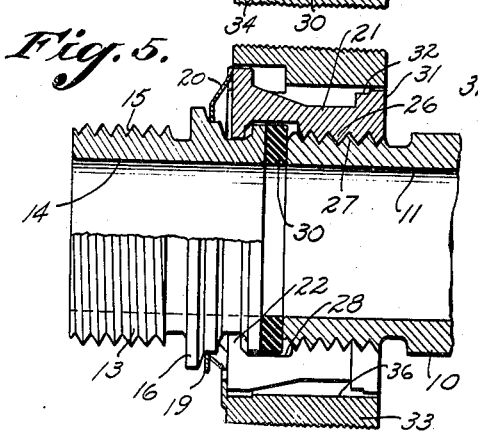
Fig. 5 is a view, partially in section, of the coupling of Fig. 1, taken on the same section lines as Fig. 1, showing the female member in position over the male member, and with the parts in position for, but prior to tightening.

After the two members 12 and 10 have been connected in the manner above described and the threads 26 and 27 have been brought into alignment, the coupling may be tightened by moving the collar 33 to its most forward position and then rotating it in the proper direction through some angle less than a complete turn. When the collar 33 has been moved to its most forward position, and before it has been rotated to tighten the coupling, the parts are as illustrated in Fig. 5. The inner forward edge of each of the flanges 22 is near the forward end of the groove 17 at the rear end of the cam surface 23, and the outer edge of the forward wall of the groove 17 is near the forward end of the cam surface 24. There is clearance between the rearmost portion 37 of the jaws and the recessed surface 38 of the collar, and between the lugs 25 and the outer walls of the slots 34. There is also clearance between the flange 31 and the interior surface 36 of the collar. At the forward end of the coupling the jaws form substantially a complete circle around the threaded male member 10.

Figure 3:
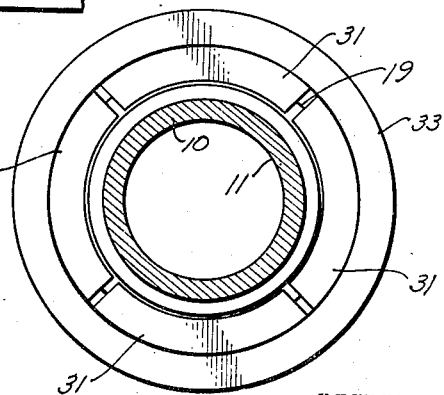
Fig. 3 is a sectional view of the coupling in the relation shown in Fig. 1, taken along the line 3—3.

In this condition, the coupling may be tightened by rotating the collar 33 in a suitable direction through a fraction of one turn relative to the male member 10. If the threads on the coupling and male member are right-hand threads, the collar is rotated in a counter-clockwise direction, as illustrated in Fig. 3. As the collar is rotated in the tightening direction, the side walls of the slots 34 engage the lugs 25 and rotate the jaws 21 together with the collar, the male member is brought against the washer 30, and further turning screws the jaws 21 forwardly, causing the inner forward edges of the flanges 22 to ride out on the cam surface 23 and the cam surfaces 24 to ride out over the outer edge of the forward wall of the groove 17. The rear portions of the jaws are in this manner expanded outwardly to bring the portions 37 of the jaws into tight contact with the recessed surface 38. At the same time, the forward portions of the jaws 21 are caused to ride up on the threads of the male mmeber 10, as shown in Fig. 1, and bring the flanges 31 into tight engagement with the interior surface 36 of the collar 33. Continued turning of the collar causes increased tightness of contact between the engaging surfaces at front and rear of the coupling and makes a connection which is fluid tight and which cannot be disconnected without rotation of the collar in the reverse direction. It will be noted that in the tightened condition of the coupling it is impossible to move the collar either forwardly or backwardly, for the collar is restricted in moving forward by engagement of the spun-over portion 40 with the jaws, while in moving backward the collar is restricted by the shoulder between the recessed surface 38 and the remaining interior surface 36 of the collar engaging the sloping surface 42. In addition to these restrictions to movement there is a great frictional force between the collar and the jaws which tends to prevent relative movement.

Occasionally there is encountered a male member whose threads are larger in diameter than the standard, which makes it difficult to move the collar to the forward position over the flanges 31. In tightening the coupling on such a male member the collar may be moved forward to a position on the step 32 and rotated in the usual manner to tighten the coupling. Under such circumstances, the forward movement of the collar is restricted by engagement of the forward end of the collar with the shoulder between the surface 32 and the outer surface of the flange 31 and is prevented from moving rearwardly by friction between the collar and the jaws.

A valuable feature of my coupling is that, if desired, the collar 33 may be moved to its forward position and the coupling may then be screwed onto the male member in the same manner as any ordinary screw type coupling.

When it is desired to disconnect the coupling, the collar 33 is rotated in the clockwise direction, in Fig. 3, through a fraction of a turn, the jaws being turned with the collar. This permits the threads 26 to again sink down into the threads 27 and makes it possible for the flanges 22 to be moved inwardly to the bottom of the groove 17. When the collar has been rotated through a fraction of a turn in the direction to loosen the coupling, it may then be moved rearwardly, the interior surface 36 of the collar riding up over the rearmost portions 37 of the jaws and forcing the flanges 22 to the bottom of the groove 17. The rearward movement of the collar is continued until the walls 35 of the slots 34 engage the lugs 25. The coupling member 12 may then be pulled directly off of the male member 10 or may be broken off at an angle. In either case, the forward sides of the teeth 27 engage the rear sides of the teeth 26 and cause the jaws to be deflected outwardly enough to permit the separation of the coupling member 12 from the male member 10. In this operation, as well as in the operation of connecting the coupling to the male member, it is found that no damage is done to the threads of either the male member or the jaws of the coupling. The threads are only burnished by rubbing over one another.

Instead of pulling the coupling member 12 off of the male member 10, the collar 33 may be forced rearwardly to tilt the jaws 21 around the inner rear edges of the flanges 22, against the force of the spring arms 20, so as to deflect the forward portions of the jaws outward to such an extent that the coupling member 12 may be removed without dragging the teeth 26 over the teeth 27, or to such an extent that the pressure on the teeth is considerably reduced. This feature is very useful, particularly in connection with large couplings.

Figure 6:
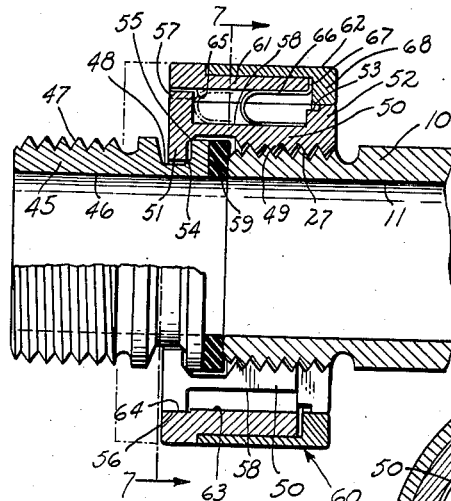
Fig. 6 is a view, partially in section, of an alternative form of coupling, showing the female member in tightened coupled relation with a threaded male member, the section being taken along the line 6—6 of Fig. 7.
Figure 7:
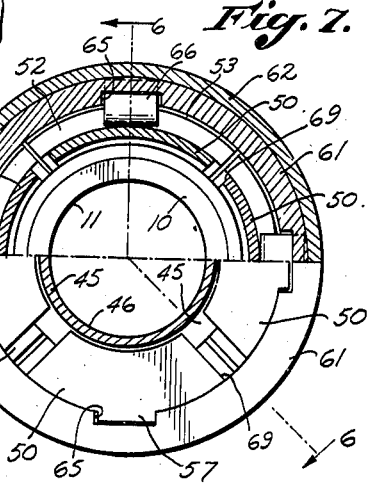
Fig. 7 is a sectional view of the coupling of Fig. 6 in the relation shown therein, and taken along the line 7—7.

An alternative form of coupling for connecting to the male member 10 is illustrated in Figs. 6 and 7, which embodies many of the features of construction of the coupling previously described but employs a different type of spring means for urging the jaws inwardly. This form of coupling is shown in rotative connection with a member 45 having a fluid passage 46 therethrough and bearing exterior threads 47. The member 45 has at its forward end a groove 48. Surrounding the forward end of the member 45 are a plurality of jaws 50, four in number in the disclosed embodiment, having at their rear ends inwardly directed flanges 51 disposed with clearance within the groove 48. As in the form of coupling previously described, the forward portions of the jaws are internally threaded at 49 to match the threads of the male member 10 to which the coupling is to be connected, and carry outwardly directed flanges 52 each having a stepped outer surface providing a recess 53. The rear wall of the groove 48 slopes rearwardly to facilitate deflection of the jaws, and a cam surface 54 is provided at the forward end of the groove 48, as in the previously described coupling. The jaws 50 also are provided with cam surfaces 55 at the outer ends of the forward surfaces of the flanges 51 to cooperate with the outer edge of the forward wall of the groove 48, as above described. Within the coupling, adjacent the forward end of the member 45, is located a resilient washer 59.

The outer surface 56 of the rearmost portion of each of the jaws 50 is preferably circular except for a lug 57 which projects outwardly therefrom. The exterior of each of the jaws is formed with a groove 58 extending from the forward flange 52 to the rearmost portion which carries the lug 57. Surrounding the jaws 50 is a collar 60 which preferably comprises two parts 61 and 62. The interior of the part 61 is a straight cylindrical surface 63 with the exception of the recessed rearmost portion 64 of slightly larger radius and of the slots 65 adapted to receive with clearance the lugs 57 and extending completely through the part 61 in an axial direction. In each of the slots 65 is located a U-shaped spring 66 of slightly less width than the slot. At the forward end of its outer half, each spring 66 is bent outwardly at 67 and is clamped at this point between the parts 61 and 62 of the collar 60, the part 62 being pressed over the part 61 to securely connect the parts 61 and 62 and the springs 66 into one unit. The forward portion 68 of the part 62 extends inwardly to provide an interior surface having clearance over the flange 52 in the untightened condition of the coupling. The surface 63 likewise has clearance over the surface 56 of the rearmost portion of the jaws. Thus the collar 60 may, in the untightened condition of the coupling, be moved rearwardly and is only limited in its movement by engagement of the rear end of the spring 66 with the rear wall of the groove 58, as indicated in dotted lines in Fig. 6. The length of the spring 66 is made such that when the collar is in its rearmost position relative to the jaws 50, the jaws are permitted to be deflected outwardly with the forward portion 68 of the collar being received in the groove 58. The inner halves of the springs 66 are so dimensioned that when the forward movement of the collar is limited by engagement of the inner halves of the springs with the forward wall of the groove 58, the forward end of the collar is aligned with the forward ends of the jaws 50, as shown. Thus, the springs 66 serve three functions: first, they urge the forward threaded portions of the jaws 50 inwardly; second, they act as a rearward stop for the collar; third, they act as a forward stop for the collar.

The operation of this form of coupling is similar to that previously described. In connecting the coupling to the male member 10, the collar 60 is moved to its rearmost position relative to the jaws 50. In this position, the jaws 50 are urged inwardly by the springs 66 to bring the forward ends and flanges 52 of the jaws together so that they form arcs of a common complete circle with the threads at substantially the same pitch diameter as those of the male member, while slots 69 exist between the rear portions of the jaws to permit deflection thereof. In this position, the mutual engagement of the jaws adjacent their forward ends prevents the jaws from collapsing inwardly at their forward ends. The flanges 51 rest at the bottom of the groove 48. The coupling may then be forced over the male member 10 or the jaws 50 may be deflected outwardly by rearward movement of the collar 60 relative to the member 45 to open the jaws for admission of the member 10, as previously described in connection with the coupling of Figs. 1–5. After the coupling has been installed on the member 10 and the threads aligned, as previously described, the collar is moved forward as far as it will go and, for right-hand threads, is rotated through a part of one turn in a clockwise direction, as illustrated in Fig. 7, to tighten the coupling.

In tightening, the action is very similar to that of the previously described coupling. The jaws are moved forward and, as a consequence, the rear portions thereof are moved outwardly by action of the cam surfaces 54 and 55 into the position shown, wherein the surface 56 engages the recessed portion 64 of the collar to prevent rearward movement of the collar, and the forward portions of the jaws are expanded outwardly to engage the flange 52 with the forward portion 68 of the collar. If an unusually large thread is encountered on the male member, the collar may be engaged by the recess 53, as previously described.

In loosening and removing the coupling, the collar is rotated through a fraction of a turn in the counter-clockwise direction in Fig. 7, for right-hand threads, and is then moved rearwardly, whereupon the coupling may be pulled off of the male member or removed by first spreading the jaws, all as previously described.

Figure 8:
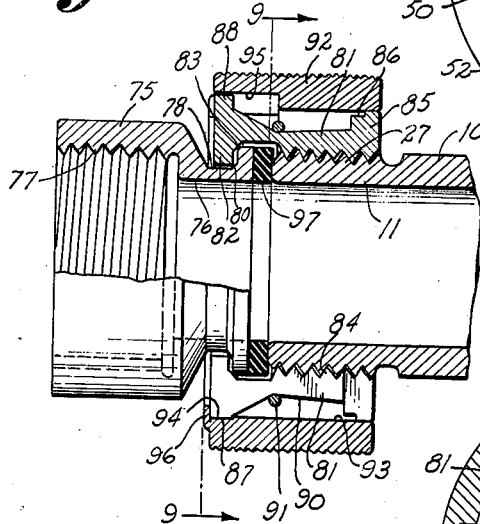
Fig. 8 is a view, partially in section, of an alternative form of coupling, showing the female member in tightened coupled relation with a threaded male member, the section being taken on the line 8—8 of Fig. 9.
Figure 9:
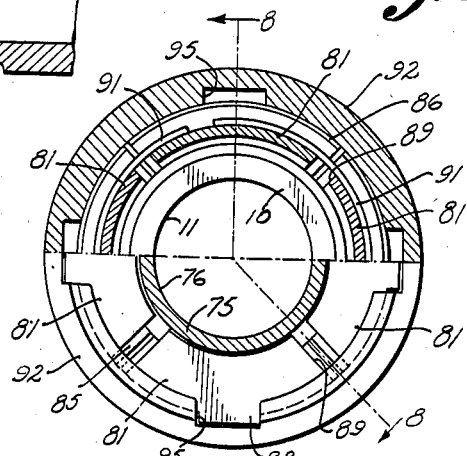
Fig. 9 is a sectional view of the coupling of Fig. 8 in the relation shown therein, and taken along the line 9—9.

In Figs. 8 and 9 is shown another alternative form of coupling having many of the features of construction of the previously described couplings, but having still another type of spring means for urging the jaws inwardly. This form of coupling is also adapted to be connected to the male member 10 and is shown as being rotatively attached to a member 75 having a fluid passage 76 therethrough and being internally threaded at 77. The member 75 has adjacent its forward end an annular groove 78 with a rearwardly sloping rear wall and with a cam surface 80 similar to the couplings previously described. Surrounding the forward end of the member 75 are a plurality of jaws 81, four in number in the disclosed embodiment, having at their rear ends inwardly directed flanges 82 disposed within the groove 78. Each of the jaws 81 is formed to provide a cam surface 83 adjacent the flange 82, as in the couplings previously described. The forward portions of the jaws are provided with internal threads 84 matching the threads 27 of the male member 10. At the forward end of each jaw is an outwardly directed flange 85 having at its rear a recess 86.

The outer surface 87 of the rearmost portion of each of the jaws 81 is preferably circular except for a lug 88 which projects outwardly therefrom. The exterior of each of the jaws is formed with a groove 90 preferably having a relatively steeply sloping rear wall joining the surface 87 and a forward wall sloping relatively gently to the flange 85. At the portion of smallest diameter is a relatively stiff split spring wire 91 surrounding all the jaws 81 and urging them inwardly. Surrounding the jaws is a collar 92 having an interior surface 93 which has clearance over both the flange 85 and the surface 87 in the untightened condition of the coupling. At the rear end of the jaws the surface 93 is enlarged to provide a surface 94 of slightly greater radius than the surface 93 and having an axial extent somewhat greater than the surface 87. Slots 95 are formed in the rear of the collar 92 to receive, with clearance, the lugs 88, the slots extending axially only part way through the collar. An axially directed extension is preferably spun inwardly to form a stop 96 which limits the forward movement of the collar relative to the jaws. It will be evident that the collar 92 is similar to the collar 33 of the coupling of Figs. 1–5. A resilient washer 97 is located within the coupling adjacent the forward end of the member 75.

In the untightened condition of the coupling, the jaws 81, urged inwardly by the spring 91, assume positions, determined by engagement of the forward portions of the jaws with one another, wherein the jaws form arcs of a common circle with the threads on substantially the same pitch diameter as those of the male member. By reason of the narrower arcuate extent of the jaws in their rear portions, slots 89 are formed between the rear portions of the jaws which provide ample clearance for deflection of the jaws.

The operation of this form of coupling is the same as that of Figs. 1–5. To connect the coupling to the male member 10, the collar 92 is brought to the rearmost position relative to the jaws 81, in which position the rear walls of the slots 95 engage the lugs 88, and the coupling is then forced over the member 10 or the jaws are opened up by rearward movement of the collar relative to the member 75 to admit the member 10, as previously described. When the male member 10 is in position against the washer 97 and the threads are aligned, the collar 92 is moved forwardly until the stop 96 engages the rear faces of the jaws, as previously described. To tighten the coupling, the collar 92 is then rotated through a fraction of a turn in the clockwise direction, in Fig. 9, for right-hand threads, to bring the flange 85 tightly into engagement with the surface 93 of the collar and the surface 87 tightly into engagement with the recess 94 in such manner as to prevent the rearward movement of the collar and to securely hold the whole coupling in the tightened condition. To loosen the coupling, the collar is rotated in the counter-clockwise direction, in Fig. 9, for right-hand threads, through a fraction of one turn until the collar is permitted to be moved rearwardly, whereupon the collar is moved to its rearmost position and the coupling is removed from the member 10 in the same manner as the couplings previously described.

In all of the couplings herein described the jaws are resiliently urged inwardly into positions wherein they form arcs of a common circle with the threads at substantially the same pitch diameter as those of the male member to which the coupling is to be connected. When the coupling is put on a male member, therefore, the jaws automatically engage it and the greatest convenience in operation results.

In the three forms of coupling described herein the principal difference is in the spring means for urging the jaws inwardly. All three of the forms disclosed herein have the jaws and collar rotatively connected by means of lugs on the jaws which are slideable in slots in the collar. Many of the features of construction of the couplings disclosed herein, however, are also applicable to the type of coupling disclosed in my co-pending application, above referred to, in which the jaws are rotatively connected to the collar by means of lugs which lie in slots between the jaws.

In any of the couplings disclosed herein the washer may be dispensed with, if desired, and the forward end of the member on which the coupling is rotatably mounted may be provided with a seat similar to those employed in valves, and the end of the male member to which the coupling is to be connected may be shaped to cooperate with this seat so that when the coupling is tightened it will be fluid-tight.

It is understood that various changes and modifications in design and construction from the couplings disclosed herein may be made without departing from the spirit and scope of the invention as defined in the appended claims.

I claim as my invention:

1. A coupling for connecting a first member with a second member, said second member being externally threaded, comprising: walls on said first member forming an external annular groove; a plurality of jaws internally threaded at their forward ends and having adjacent their rear ends inwardly directed flanges rotatably disposed in said groove; walls on said jaws forming an external annular groove and an outwardly directed flange at the forward end of each of said jaws; means resiliently urging said jaws radially inward; lugs projecting outwardly from said jaws; an axially movable collar surrounding said jaws and having slots therein in which said lugs are slideably disposed to permit axial movement of said collar relative to said jaws, said collar being adapted in its most forward position to restrict outward deflection of said jaws by engagement therewith at both forward and rear ends of said jaws; and walls forming on the interior surface of said collar a shoulder located forward of the rear engaging portions of said jaws acting as a stop to prevent rearward movement of the collar in the tightened condition of the coupling.

2. A coupling for connection with a threaded male member, comprising: a plurality of internally threaded jaws independently deflectable in a radial direction, said jaws having formed thereon an external annular groove and forward of said groove an outwardly directed flange on each of said jaws having a stepped outer surface; means resiliently urging said jaws inward; and a collar axially slideable but in rotative connection with said jaws, said collar being axially movable to a rear position in which said jaws are deflectable outwardly over the threads of said male member, the forward end of said collar being received in said groove, and said collar being movable to either of two forward positions wherein outward deflection of said jaws due to rotation of said collar brings into engagement with the interior surface of said collar, respectively, the steps of said outer surface of said flanges.

3. A coupling for connecting a first member with a second member, said second member being externally threaded, comprising: walls forming an external annular groove on said first member, there being an outwardly and forwardly sloping wall connecting the inner and forward walls of said groove, forming a first cam surface; a plurality of jaws internally threaded adjacent their forward ends and having adjacent their rear ends inwardly directed flanges rotatably disposed in said groove, there being formed on the forward surface of each of said flanges a second cam surface, adjacent the outer edge of the forward wall of said groove, said second cam surfaces sloping outwardly and forwardly; resilient means urging the forward ends of said jaws radially inward; and an axially movable collar surrounding said jaws in rotative connection therewith, said collar being axially movable to a rear position in which the threaded portions of said jaws are deflectable over the threads of said second member, and said collar being axially movable to a forward position in which the collar restricts the outward movement of said jaws at both the forward and rear ends thereof to less than the depth of threads on said second member, said first and second cam surfaces cooperating with the opposing surfaces of said flanges and said forward wall of said groove, respectively, to move the rear ends of said jaws outwardly upon forward movement of said jaws incident to tightening of said coupling by rotation of said collar in the tightening direction.

4. A coupling for connecting a first member with a second member, said second member being externally threaded, comprising: walls forming an external annular groove on said first member; a plurality of jaws internally threaded adjacent their forward ends and having adjacent their rear ends inwardly directed flanges rotatably disposed in said groove; a member rotatably supported on said first member and carrying resilient arms bearing axially on the rear ends of said jaws in such manner as to urge the rear ends of said jaws forward and hence the forward ends of said jaws radially inward; an axially movable collar surrounding said jaws and adapted in a rear position to permit the forward threaded portions of said jaws to be deflected outwardly over the threads of said second member, and in a forward position to restrict the outward deflection of said jaws in such manner that rotation of said jaws in a direction tending to screw said coupling onto said second member tightens said coupling.

5. A coupling for connecting a first member with a second member, said second member being externally threaded, comprising: walls on said first member forming an external annular groove; a plurality of jaws internally threaded adjacent their forward ends and having adjacent their rear ends inwardly directed flanges rotatably disposed in said groove, said jaws being formed with an external annular groove; lugs projecting outwardly from said jaws; an axially movable collar surrounding said jaws and having slots therein in which said lugs are slideably disposed to permit axial movement of said collar relative to said jaws; and U-shaped springs attached to said collar within said slots and bearing on said jaws within said groove on said jaws to urge said jaws radially inward, said collar being movable to a rear position determined by engagement of the rear end of said springs with the rear wall of said groove on said jaws, in which position the forward ends of said jaws are permitted to deflect outwardly over the threads of said second member, the forward end of said collar being received in said groove on said jaws, and said collar being movable to a forward position determined by engagement of said springs with the forward wall of said groove on said jaws, in which position said collar restricts the outward movement of said jaws to less than the depth of threads on said second member.

WILLIAM C. IFTIGER, Sr.